(12) United States Patent
Valtanen

(10) Patent No.: US 10,093,309 B2
(45) Date of Patent: Oct. 9, 2018

(54) ARRANGEMTENT FOR OPTIMIZING LOAD POSITION IN RELATION TO PLURALITY OF TRANSPORTATION VEHICLES

(71) Applicant: Rakkatec Oy, Helsinki (FI)

(72) Inventor: Jarkko Valtanen, Helsinki (FI)

(73) Assignee: Rakkatec Oy, Helsinki (FI)

( * ) Notice: Subject to any disclaimer, the term of this patent is extended or adjusted under 35 U.S.C. 154(b) by 2 days.

(21) Appl. No.: 15/140,956

(22) Filed: Apr. 28, 2016

(65) Prior Publication Data

US 2017/0313303 A1 Nov. 2, 2017

(51) Int. Cl.
*B60W 30/04* (2006.01)
*B60P 3/00* (2006.01)
*G05D 1/00* (2006.01)
*G05D 1/02* (2006.01)

(52) U.S. Cl.
CPC .............. *B60W 30/04* (2013.01); *B60P 3/00* (2013.01); *B60W 2300/12* (2013.01); *G05D 1/0022* (2013.01); *G05D 1/0287* (2013.01)

(58) Field of Classification Search
CPC ........... G05D 1/0293; G05D 3/00; B60P 1/00; B62D 12/02
USPC ............................ 701/41, 300; 414/495, 800
See application file for complete search history.

(56) References Cited

U.S. PATENT DOCUMENTS

| 5,572,449 A * | 11/1996 | Tang ................. B60K 31/0008 180/170 |
| 2009/0142173 A1* | 6/2009 | Weigand ................ B62D 12/02 414/495 |
| 2009/0143985 A1* | 6/2009 | Weigand .............. G05D 1/0293 701/300 |

* cited by examiner

*Primary Examiner* — Thomas G Black
*Assistant Examiner* — Wae L Louie
(74) *Attorney, Agent, or Firm* — Ziegler IP Law Group, LLC

(57) ABSTRACT

An arrangement and method for optimizing load position in relation to a plurality of transportation vehicles comprising at least one master vehicle and at least one slave vehicle, the arrangement comprising a platform arranged to the at least one slave vehicle for receiving a load; an actuating device of the at least one slave vehicle for moving the platform in relation to the at least one slave vehicle; a sensing device configured to generate a vehicle sensing signal and/or a non-vehicle sensing signal; an controlling device of the at least one master vehicle. The controlling device is configured to receive at least one of the vehicle sensing signal and the non-vehicle sensing signal; generate controlling commands based on the received at least one of the vehicle sensing signal and the non-vehicle sensing signal; and transmit the controlling commands to the actuating device, wherein the actuating device is configured to receive the controlling commands and to move the platform in relation to the transportation vehicle based on the controlling commands.

20 Claims, 10 Drawing Sheets

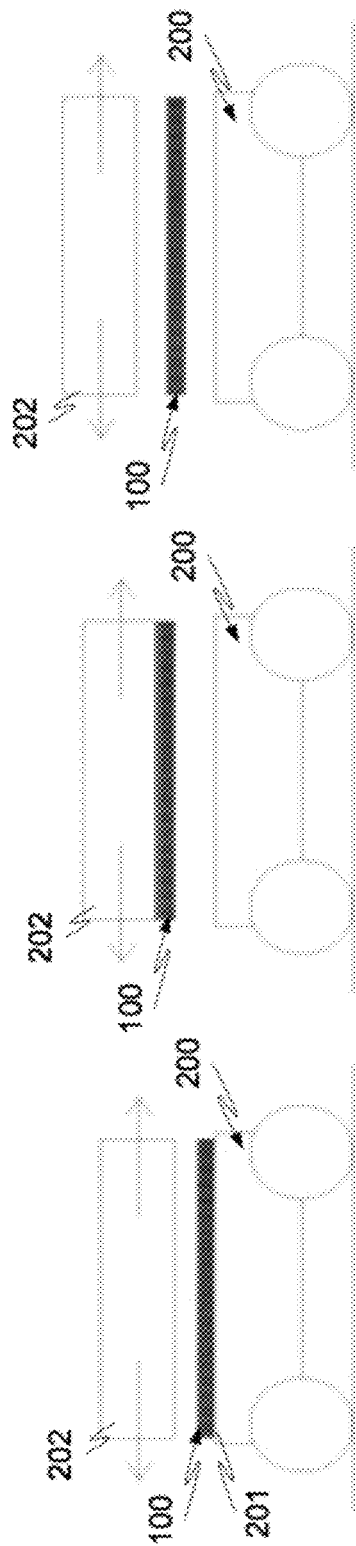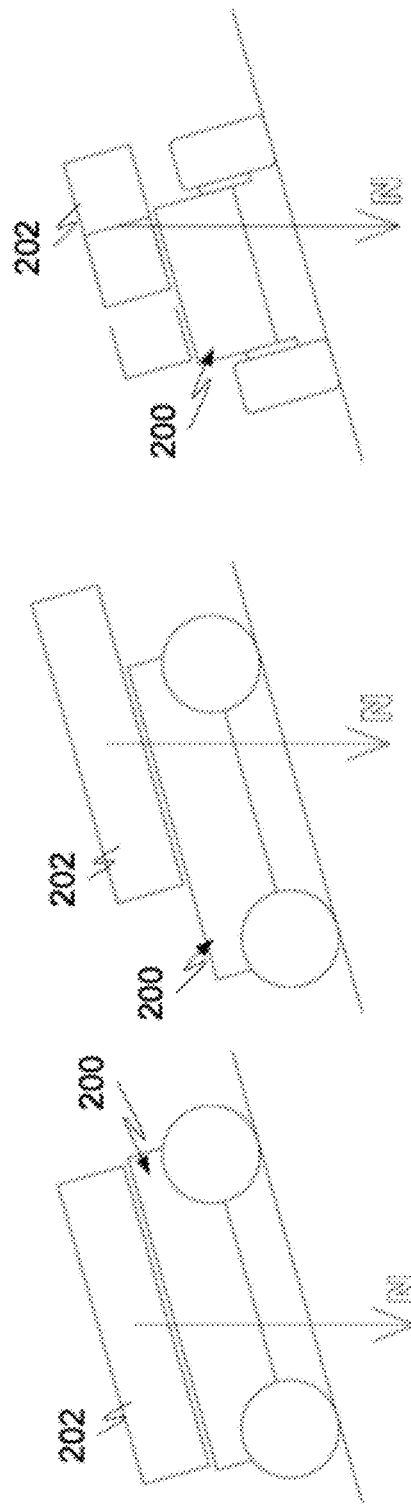

ARRANGEMTENT FOR OPTIMIZING LOAD POSITION IN RELATION TO PLURALITY OF TRANSPORTATION VEHICLES

TECHNICAL FIELD

The invention relates to an arrangement for optimizing load position in relation to a plurality of transportation vehicles. Especially the invention relates to the optimization system for off-road, off-shore and unstable transportation vehicles.

BACKGROUND

This section illustrates useful background information without admission of any technique described herein being representative of the state of the art.

The present invention aims to mitigate the problems of the previous solutions by providing an arrangement that can be used to build a cost effective high performance load optimization arrangement utilizing a plurality of vehicles.

Transportation vehicles are typically equipped with shock absorbers, which might be active or controllable so that the vehicle can be tilted or banked for example when driving in a sloping surface, rough terrain, snow conditions, forest, and difficult environments, and thereby balancing the vehicle. There are however some disadvantages relating to the known prior art transportation systems, such as they are quite limited in their operational ranges for balancing the vehicles and especially any stability of loads to be transported are very limited. In addition problems are also related when transporting long and large loads, such as long pipes or heavy loads, where only one transportation vehicle is not enough.

SUMMARY

Various aspects of examples of the invention are set out in the claims.

According to a first example aspect of the present invention, there is provided an arrangement for optimizing load position in relation to a plurality of transportation vehicles comprising at least one master vehicle and at least one slave vehicle, the arrangement comprising:
  a platform arranged to the at least one slave vehicle for receiving a load;
  an actuating device of the at least one slave vehicle for moving the platform in relation to the at least one slave vehicle;
  a sensing device configured to generate a vehicle sensing signal and/or a non-vehicle sensing signal;
  a controlling device of the at least one master vehicle configured to:
    receive at least one of the vehicle sensing signal and the non-vehicle sensing signal;
    generate controlling commands based on the received at least one of the vehicle sensing signal and the non-vehicle sensing signal; and
    transmit the controlling commands to the actuating device
  wherein the actuating device is configured to receive the controlling commands and to move the platform in relation to the transportation vehicle based on the controlling commands.

In an embodiment, the arrangement further comprises at least two transportation vehicles for transporting the load, the load being common for at least two of the transportation vehicles, each vehicle comprising:
  a platform for receiving the load, and
  an actuating device of at least one vehicle for moving the platform in relation to the at least two of the transportation vehicles;
  wherein the actuating device is configured to receive the controlling commands and to move the platform in relation to the at least two of the transportation vehicles based on the controlling commands.

In an embodiment, the actuating device is configured to move the platform in relation to at least one of the vehicles so that the load travels a certain path in a controlled way in relation to at least one transportation vehicle during movement of at least one transportation vehicle.

In an embodiment, the load travels a certain path in a controlled way in relation to the master vehicle.

In an embodiment, the actuating device is configured to move the platform in relation to at least one of the vehicles so that the load position or level of the load is kept constant or changed in a controlled way in relation to at least one transportation vehicle during movement of at least one transportation vehicle.

In an embodiment, the load position or level of the load is kept constant or changed in a controlled way in relation to the master vehicle.

In an embodiment,
  a sensing device of the master vehicle is configured to generate the vehicle sensing signal and/or the non-vehicle sensing signal; and
  a controlling device of the master vehicle is configured to:
    generate controlling commands based on the vehicle sensing signal and/or the non-vehicle sensing signal; and
    transmit the controlling commands to the actuating device.

In an embodiment the arrangement further comprises:
  sensing devices of a plurality of slave vehicles configured to generate the vehicle sensing signals and/or the non-vehicle sensing signals;
  the controlling device of the at least one master vehicle is configured to:
    receive the vehicle sensing signals and/or the non-vehicle sensing signals;
    generate controlling commands based on the vehicle sensing signals and/or the non-vehicle sensing signals; and
    transmit the controlling commands to the actuating device.

In an embodiment the arrangement further comprises:
  at least two slave transportation vehicles for transporting the load, the load being common for the at least two slave transportation vehicles, each slave vehicle comprising:
  a platform for receiving the load, and
  an actuating device for moving the platform in relation to at least one slave transportation vehicle;
  wherein the actuating device is configured to receive the controlling commands from a master vehicle not receiving the load, and to move the platform in relation to at least one slave transportation vehicle based on the controlling commands.

In an embodiment the arrangement further comprises:
  at least two slave transportation vehicles and at least one master transportation vehicle for transporting the load, the load being common for the at least two slave transportation vehicles and the master transportation vehicle, each vehicle comprising:
a platform for receiving the load; and
an actuating device for moving the platform in relation to at least one transportation vehicle;
wherein the actuating device is configured to receive the controlling commands from the master vehicle, and to move the platform in relation to at least one transportation vehicle based on the controlling commands.

In an embodiment the arrangement further comprises at least two master vehicles.

In an embodiment the arrangement further comprises:
a first master vehicle comprising:
a sensing device configured to generate a vehicle sensing signal and/or a non-vehicle sensing signal, wherein the first master vehicle not comprising a platform for receiving the load; and
a second master vehicle comprising:
a controlling device configured to:
receive the vehicle sensing signal and/or the non-vehicle sensing signal; and
generate controlling commands based on the vehicle sensing signal and/or the non-vehicle sensing signal.

In an embodiment the controlling commands comprise instructions to start the movement of the platform based on certain coordinate position and thereby controlling and changing a location or position of the platform and/or load in the coordinate position or already before the transportation vehicle arrives at the coordinate position.

In an embodiment, the controlling device is pre-programmed or a self-learning system for learning a geometry of a predriven road or being configured to receive geometry data from topography map and based on that configured to generate the controlling commands.

In an embodiment, the vehicles are configured to be operated in a synchronized manner with each other.

In an embodiment, the vehicle sensing signal comprises at least one of the following:
rotating speed information of at least one wheel of the transportation vehicle;
inclination information of at least one wheel of the transportation vehicle or the transportation vehicle; and
location of a center of gravity of the transportation vehicle and the platform.

In an embodiment, the vehicle-sensing signal comprises sensing location of a center of gravity of the transportation vehicle and the platform.

In an embodiment, the controlling commands are configured to control moving the platform in relation to the vehicle so that the center of gravity is kept within a certain area or to balance or manage weight distribution between different portions of the vehicle.

In an embodiment, the sensing device comprises pressure or weight sensing device for determining pressure or weight difference or distribution between at least on two points of the arrangement or the vehicle, whereupon the sensing device is configured to determine location of the center of gravity of the arrangement or the vehicle based on the pressure or weight difference, or the distribution.

In an embodiment the sensing device for generating the vehicle sensing signal comprises at least one of the following:
an accelerometer;
an inclinometer;
a vehicle tyre pressure sensor;
a pressure or weight sensing sensor;
an angular velocity sensor; and
a global navigation satellite system (GNSS) device.

In an embodiment, the sensing device for generating the non-vehicle sensing signal comprises at least one of the following:
a geomagnetic field sensor;
a transceiver for receiving weather information and/or topography information;
a camera;
an IR-scanner;
an ultrasound scanner;
a user input device to receive and generate control information generated in response to driver input;
a light detection and ranging (Lidar) device; and
a radar.

In an embodiment, the non-vehicle sensing signal comprises at least one of the following:
terrain information relating to current position of the vehicle;
terrain information relating to a path in a heading of the vehicle;
terrain information around the vehicle;
control information generated in response to driver input;
weather information; and
topographic information.

In an embodiment, the terrain information comprising geometry of the path in the heading of the vehicle.

In an embodiment, the actuating device is configured to initiate the moving of the platform based on geometry changes on the path.

In an embodiment, the actuating device is configured to perform at least one of the following:
move the platform in a XY-plane, Z-direction being essentially perpendicular to the XY-plane;
tilt or bank the platform in relation to at least one of the X, Y and Z axes; and
rotate the platform around a point locating in the XY-plane.

In an embodiment, the actuating device comprises at least one of the following: a hydraulically or pneumatically operated cylinder, an electric motor, a threaded rod, a push bar, and a chain.

In an embodiment, the first end of the actuating device is configured to be operationally coupled with the platform and another end is configured to be operationally coupled with the vehicle either directly or via an accessory device, and further wherein length, angle or position of the actuating device is configured to be adjusted based on the controlling commands.

According to a second example aspect of the present invention, there is provided a transportation vehicle, comprising an arrangement of the first example aspect.

In an embodiment, the transportation vehicle further comprises at least one moving device for moving the vehicle, each of the moving devices being coupled with the vehicle via a mounting, where the mounting is configured to adjust height or distance of the moving devices in relation to the vehicle.

According to a third example aspect of the present invention, there is provided a method for optimizing load position in relation to a plurality of transportation vehicles comprising at least one master vehicle and at least one slave vehicle, wherein at least one slave transportation vehicle comprises a platform for receiving a load, and an actuating device for moving the platform in relation to the transportation vehicle, the method comprising:

generating a vehicle sensing signal and/or a non-vehicle sensing signal by a sensing device;
generating controlling commands based on the vehicle sensing signal and/or the non-vehicle sensing signal by a controlling device of at least one master vehicle; and
moving the platform in relation to the transportation vehicle based on the controlling commands by the actuating device.

In an embodiment, the method further comprising:
receiving external control information by a controlling device; and
generating controlling commands based on the external control information, the vehicle-sensing signal and/or the non-vehicle sensing signal by the controlling device.

In an embodiment, the external control information is received from at least one of the following:
another transportation vehicle;
a user device; and
a cloud server.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIGS. 1A-1C illustrate principles of exemplary arrangement and a transportation vehicle with said arrangement according to an embodiment of the invention, FIGS. 2-4 illustrate exemplary principles for optimizing and/or balancing the transportation vehicle according to an embodiment of the invention.

DETAILED DESCRIPTON OF THE DRAWINGS

Figure 3:
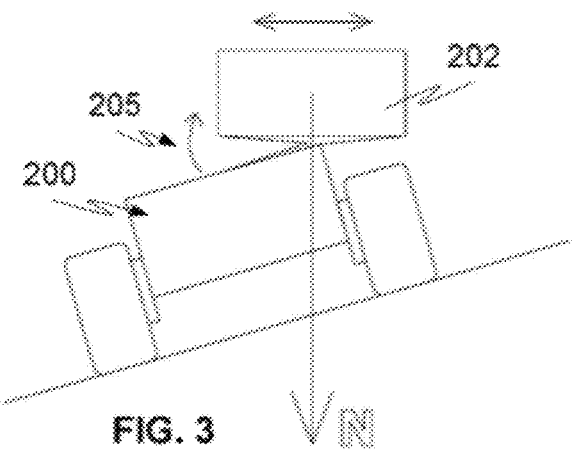

The present invention and its potential advantages are understood by referring to the drawings. In this document, like reference signs denote like parts or steps.

FIGS. 1A-1C and 2A-2C illustrate principles of exemplary optimizing arrangements 100 and transportation vehicle 200 with said arrangement for optimizing load position in relation to a plurality of transportation vehicles comprising at least one master vehicle and at least one slave vehicle according to an embodiment of the invention. The optimizing and/or balancing system 100 for the transportation vehicle 200 can be operationally coupled with the transportation vehicle in many ways, such as it can be fixed directly to the body 201 of the transportation vehicle 200, as is described in FIG. 1A, or it can be a portion of or fixed with a platform 202 of the vehicle, as is described in FIG. 1B. The platform can be any system which is able for receiving a load, such as a freight container, tank, receptacle, trough, chassis or any other device or base suitable for receiving a load, or even portion of said load, such as a base of a tool, the tool being as said load, for example. In addition according to an embodiment the optimizing systems 100 may also be a separate, independent system, as is described in FIG. 1C, whereupon it can be arranged between the transportation vehicle and the platform or it can be used as linking and connecting the transportation vehicle and the platform with each other. The platform can be any system, which is able for receiving a load, and especially a common load being common for at least two transportation vehicles 200. According to an embodiment the optimization systems 100 may be a detachable, independent system, as is described in FIG. 1C, whereupon it can be operationally coupled between the transportation vehicle and the platform or it can be used as linking and connecting the transportation vehicle and the platform with each other.

The arrangement is configured for managing the path of the load to be suitable for a terrain or space where the transportation vehicles are travelling or so that the track of the load and especially the track of the load between the moving vehicles or in relation to at least one vehicle of the system travel a certain path, as can be seen in FIGS. 12A-12E and 13A-13F, for example.

The arrangement 100 is configured for optimizing load position in relation to a transportation vehicle 200, the arrangement 100 comprising a platform 202 arranged to the transportation vehicle 200 for receiving a load; and an actuating device for moving the platform 202 in relation to the transportation vehicle 200, wherein the actuating device is configured to receive controlling commands and to move the platform 202 in relation to the transportation vehicle 200 based on the controlling commands.

The arrangement 100 is advantageously configured for moving the platform 202 in relation to the vehicle and thereby optimizing the system, platform and transportation vehicle 200 in order to manage or keep a centre of gravity in a certain area of a frame of the vehicle 200, for example, to optimize the load position in relation to the vehicle 200 in light of the vehicle 200 off-road movement, for example, as can be seen in FIGS. 2A-2C and FIG. 4.

Figure 4:
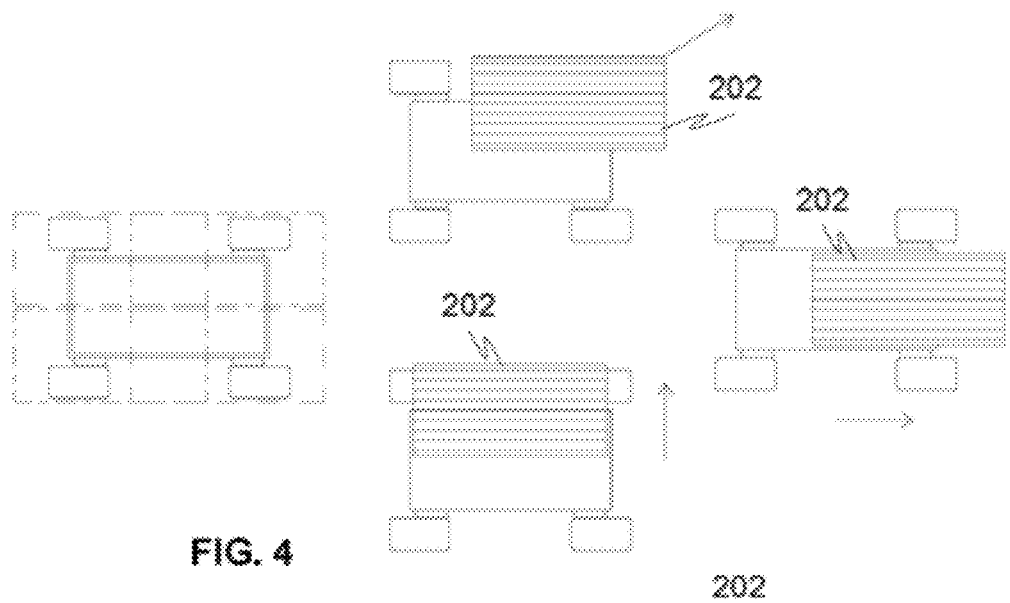
Figure 5A:
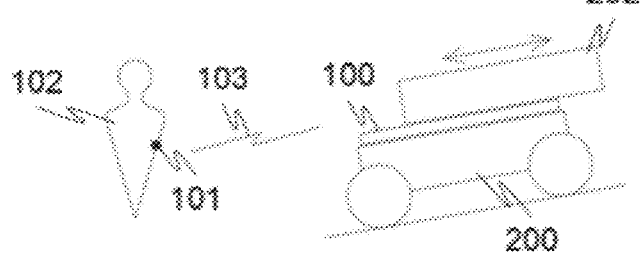
FIGS. 5A-5D illustrate exemplary optimizing arrangements with a controlling arrangement for controlling the load and transportation vehicle with said optimizing arrangement according to an embodiment of the invention.
Figure 5B:
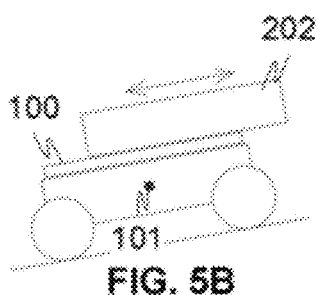
Figure 5C:
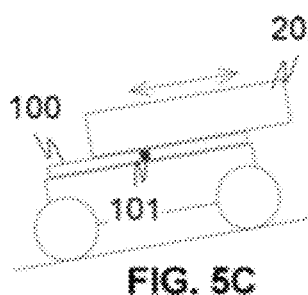
Figure 5D:
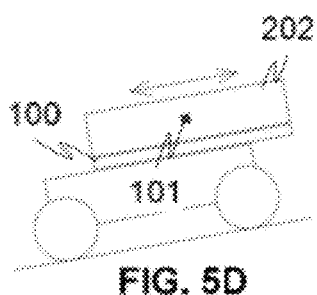

FIGS. 2-4 illustrate exemplary principles for optimizing and/or balancing the transportation vehicle according to an embodiment of the invention.

FIGS. 5A-5D illustrate exemplary optimizing arrangements with a controlling arrangement for controlling the load and transportation vehicle with said optimizing arrangement according to an embodiment of the invention.

In an embodiment, a controlling device 101, 1421 may generate controlling commands for the actuation device 204, wherein the actuating device 204 is configured to receive the controlling commands and to move the platform 202 in relation to the transportation vehicle 200,1420 based on the controlling commands.

The optimization may relate to movement of the vehicle 200, 1420 on swampy terrain, on sand or in water, for example. Other terrains for optimization may comprise, bumpy terrain, and a slope, for example. Also the load being transferred may set requirements for optimization. Such load may comprise, for example patient(s), liquids, fragile equipment, hazardous materials or a sensing device measuring and/or collecting data.

In an embodiment, any of the vehicles 200, 1420 may be unmanned or manned. The vehicle 200, 1420 may also comprise elements for loading and/or unloading transferred load to/from the vehicle.

Figure 6:
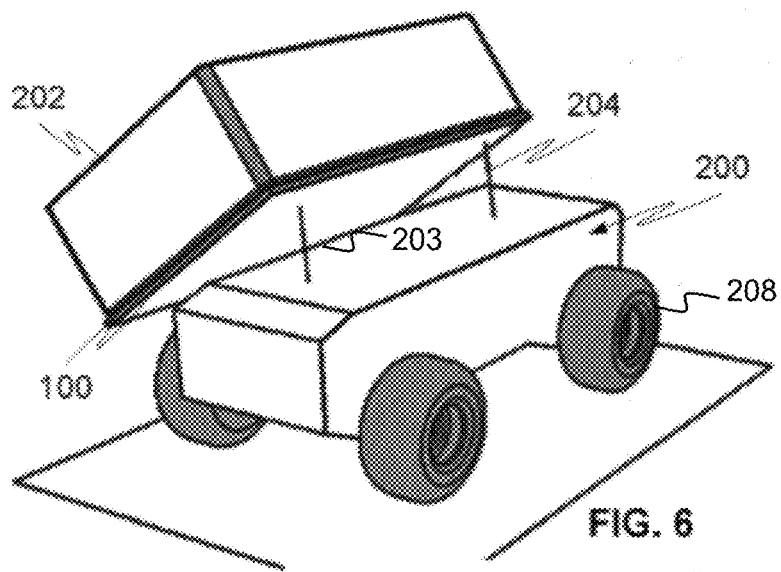
FIGS. 6-8 illustrate exemplary actuating device for optimizing and/or balancing the transportation vehicle according to an embodiment of the invention.
Figure 7:
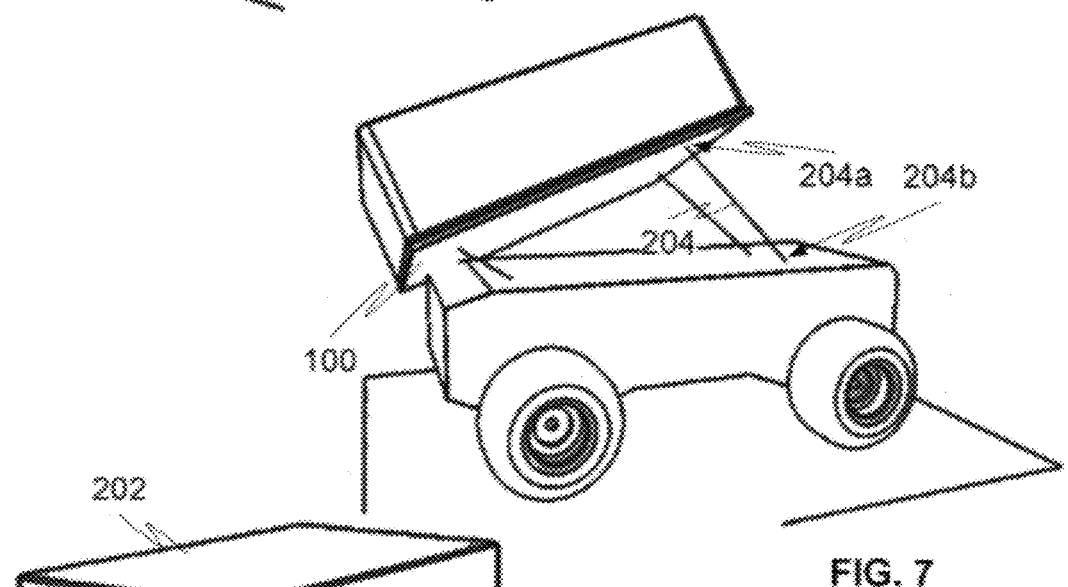
Figure 8:
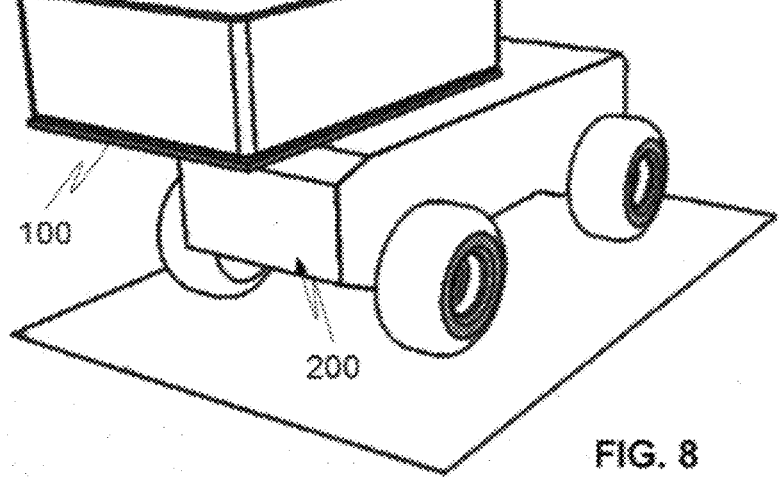

FIGS. 6-8 illustrate exemplary actuating means for optimizing and/or balancing the transportation vehicle according to an embodiment of the invention.

The optimizing system may for example, by an actuation device, move the platform 202 essentially in an X-Y -plane, or moving it in Z-direction (XYZ representing normal rectangular coordinate system, Cartesian coordinates) at least in one point, or (3D) tilting or banking the platform 202 in relation to at least one axis of X, Y or Z axes, as can be additionally seen also in FIGS. 6, 7 and 8. The platform 202 may be for example hinged at a certain point 203 around which the tilting is configured to be happened. In FIG. 6 the arrangement comprises a hinge on the edge area 203 of the vehicle 200 and/or the platform 202 to enable hinge operation for the platform 202. The optimizing system may also comprise actuating device 204, such as one, two or more cylinders or the like, which are configured to cause said tilting function (e.g. FIG. 6, 7). In addition the balancing system may rotate the platform 202 around a point 205 locating for example in the XYZ-coordinates, especially in XY-plane.

In an embodiment, a first end of the actuating device 204 is configured to be operationally coupled with the platform 202 and another end is configured to be operationally coupled with the vehicle 200 either directly or via an accessory device, and further wherein length, angle or position of the actuating device 204 is configured to be adjusted based on the controlling commands.

In an embodiment, the transportation vehicle 200, further comprises at least one moving device 208 for moving the vehicle 200, each of the moving devices being coupled with the vehicle 200 via a mounting, where the mounting is configured to adjust height or distance of the moving devices 208 in relation to the vehicle 200. Furthermore, also angular position of the mounting device 108 may be sensed using an inclinometer or such to provide a sensing signal corresponding to an angle of an arm of a vehicle tyre, for example. The moving device 208 may comprise, for example, a tyre or a wheel of the vehicle 200.

In an embodiment, in case of pneumatic tire failure, a vehicle centre of gravity is adjusted that enables distribution of load in such way that the load on damaged tire is minimized. Tire failure may be sensed using tyre air pressure sensor or rotating speed information generated by the sensing device as a vehicle sensing-signal. This makes it possible to drive the vehicle further despite the tire failure, for example to a more convenient location for a tire change.

The actuating device 204 may be, for example, a hydraulically or pneumatically operated cylinder, an electric motor, a magnetic motor, a threaded rod, a push bar, and a chain or the like in order to move the platform 202.

In an embodiment, the first end 204a of the actuating device is advantageously coupled with the platform 202 and another end 204b is coupled with the vehicle 200 either directly or via an accessory means, such as a frame of the optimizing arrangement 100.

The arrangement 100 further comprises a sensing device 102 configured to generate a vehicle sensing signal and/or a non-vehicle sensing signal; and a controlling device 101 configured to receive at least one of the vehicle sensing signal and the non-vehicle sensing signal; generate controlling commands based on the received at least one of the vehicle sensing signal and the non-vehicle sensing signal; and transmit the controlling commands to the actuating device 204; wherein the actuating device is configured to receive the controlling commands and to move the platform 202 in relation to the transportation vehicle 200 based on the controlling commands, as can be seen in FIGS. 5A-5D and 9, for example.

The controlling device 101 may comprise or being in a data communication connection 103 with a sensing device 102, for sensing or deriving vehicle or non-vehicle sensing information, for example the location of the centre of gravity of the arrangement 100 with the platform 202 and/or the vehicle 200. In addition the controlling device 101 may comprise or being in a data communication connection with a command means for providing the actual controlling commands for the actuating device 204 for moving the platform 202 in relation to the vehicle 200 so that the centre of gravity is kept within a certain, advantageously predefined and optimized area, for example. The sensing device 102 may be located within the vehicle 200 or external to the vehicle 200 but in both cases being in a data communication connections with the controlling device 101.

Figure 9:
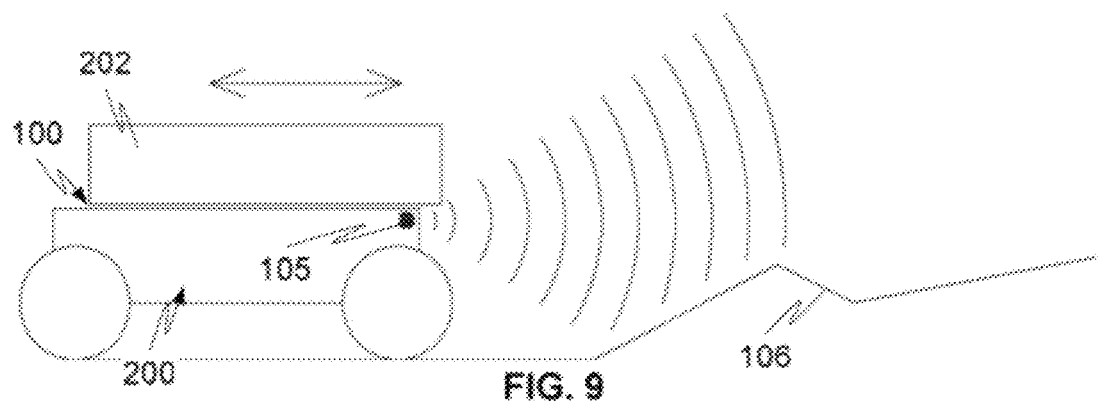
FIG. 9 illustrates an exemplary controlling system with sensing devices for balancing the transportation vehicle or load according to an advantageous embodiment of the invention.

FIG. 9 illustrates an exemplary controlling arrangement with sensing devices for optimizing and/or balancing the transportation vehicle according to an embodiment of the invention.

In an embodiment, the arrangement may also comprise sensing device 105 for sensing non-vehicle related information that may affect the vehicle 200 movement, position or the location of the centre of gravity of the system in near future in its track or course, such as a geomagnetic field sensor; a transceiver for receiving weather information and/or topography information; a camera; an IR-scanner; an ultrasound scanner; a light detection and ranging (Lidar) device; and a radar or the like, for example, for determining the topography of the routing, as is described in FIG. 9, and thereby providing the controlling commands how to move the platform 202 in relation to the vehicle 200 in an appropriate manner so that the centre of gravity will be kept within a certain, advantageously predefined area, when the vehicle arrives and passes the determined route 106.

In an embodiment, the arrangement 100 may be configured to manipulate the actuating device 204 (via the control commands) to initiate the moving of the platform 202 already before the actual geographical point 106 based on the predictive information of the becoming geometry changes on the path, such as based on the data received by the sensing device 105 or other devices suitable for generating this kind of data, like database of a topography map with position data received e.g. from GNSS, such as GPS, or other positioning device.

Figure 10:
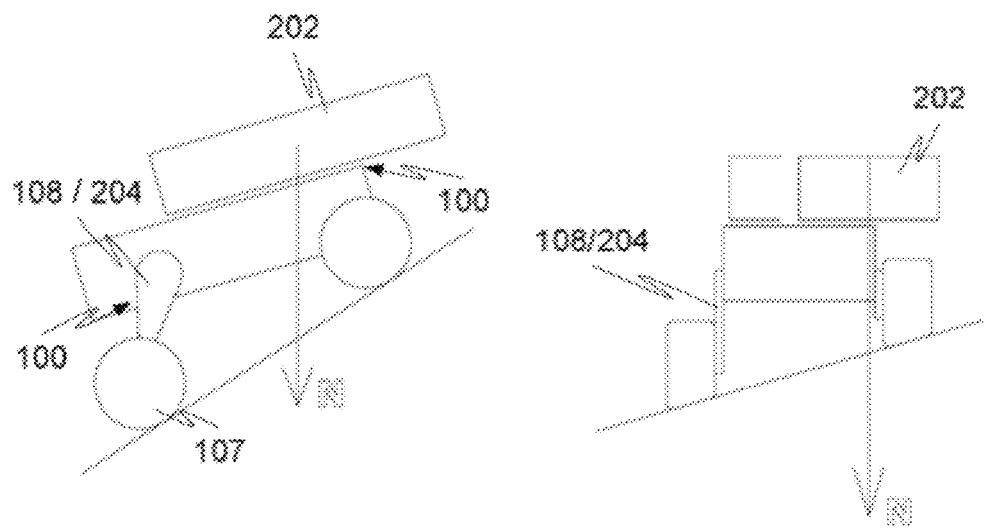
FIG. 10 illustrates another exemplary of an arrangement for optimizing and/or balancing the transportation vehicle according to an embodiment of the invention.

FIG. 10 illustrates another exemplary of an arrangement for optimizing and/or balancing the transportation vehicle according to an embodiment of the invention.

The vehicle 200 or the arrangement 100 may also comprise at least one moving device 107 for moving the vehicle 200, such as a wheel or crawler track, as is described in FIG. 10. The moving device may be coupled with the vehicle 200 or the arrangement 100 via a mounting device 108, such as e.g. an arm or cylinder or axis so that the mounting means can manipulate height or distance of the moving means in relation to the vehicle and thereby forming the arrangement and moving or tilting the vehicle or platform. Thus the mounting device 108, as manipulated and operated like described here, can be construed to be as the arrangement 100.

In an embodiment, the mounting device 108 and the moving device 107 may be implemented as a single device or as separate devices. The moving device 107 may comprise, for example, a tyre or a wheel of the vehicle 200.

Figure 11:
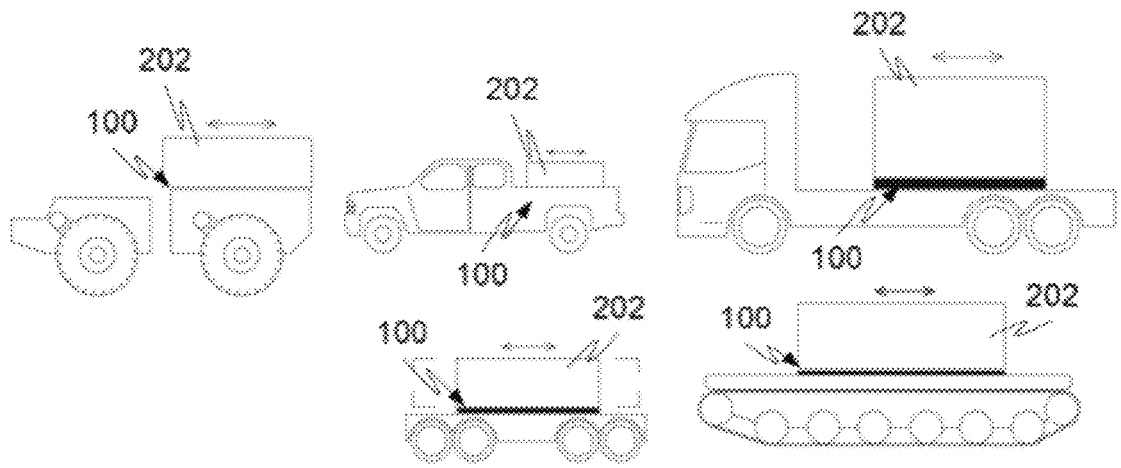
FIG. 11 illustrates examples of the transportation vehicles provided with the optimizing and/or balancing arrangement according to an embodiment of the invention.

FIG. 11 illustrates examples of the transportation vehicles provided with the optimizing and/or balancing arrangement according to an embodiment of the invention. The transportation vehicle 200 may comprise, such as an off-road, off-shore or otherwise unstable vehicle and it may be for example a car, all-terrain vehicle, caterpillar kind of vehicle, crawler, train, ship, or hovercraft. The vehicle may comprise wheels or one or more crawler tracks. The platform 202 may be a truck platform, freight container, tank, receptacle, trough, chassis or any other device or base suitable for receiving a load, or even portion of said load, such as a base of a tool, the tool being as said load. The load may be for example solid, fluid or gas load, a box, sand, rock, a tool, like a gun, water gun, lifter or any accessories as an example. The transportation vehicle may comprise manned or unmanned vehicle suitable for transporting a load in a terrain, where the load is advantageously a common load for at least two vehicles. The vehicle 200 may comprise wheels or one or more crawler tracks.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims. For example plurality of the transportation vehicles described in this document can be coupled to move in a synchronized manner with each other so that for example relative velocity and movements of the platforms of at least two of the vehicles are actuated, so moved, essentially simultaneously.

In addition it is to be noted that the vehicles of the invention can be provided with loading and unloading equipment for loading e.g. a demountable container as well as unloading it. Furthermore it is to be noted that according to an example the one vehicle may be as a main vehicle (e.g. without the load) for tracking and sensing a route and e.g. obstacles and inclinations or the like on the route and providing controlling information and/or controlling commands to at least one another vehicle transporting the load, whereupon the overall speed can be increased, because the arrangement of the vehicle carrying the load knows beforehand how to control the actuating device for moving the platform in relation to a vehicle and so to control a centre of gravity of the system or vehicle to locate within a certain area in relation to the system or vehicle by moving the platform in relation to said vehicle.

The optimization system 100 and/or actuating devices 204 is advantageously configured to receive controlling commands from a controlling device 101 in order to manipulate the actuating device 204 and thereby move the platform 202 in relation to the vehicle and thereby controlling a center of gravity, as can be seen in FIGS. 5A-5D and 10, as well as the path or orientation of the common load, as can be seen in FIGS. 12A-12E and 13A-13F, for example. The controlling device 101 may comprise or being in a data communication connection 103 with a sensing device 102 for sensing or deriving the location of the center of gravity of the system 100 or vehicle 200. In addition the controlling device 101 may comprise or being in a data communication connection with a command means for providing the actual controlling commands for the actuating device 204 for moving the platform 202 in relation to the vehicle 200 so that the center of gravity is kept within a certain, advantageously predefined area, and/or that the path or orientation of the common load is controlled as described elsewhere in this document in relation to at least one transportation vehicle 200.

The system may also comprise sensing devices 105 for predicting the location of the center of gravity of the system in near future in its track or course, such as a camera, IR-scanner ultrasound scanner, laser scanner or radar or the like for determining the topography of the routing, as is described in FIG. 9, and thereby providing the controlling commands how to move the platform 202 in relation to the vehicle 200 in an appropriate manner so that the center of gravity will be kept within a certain, advantageously predefined area and/or controlling the path or orientation of the common load as described elsewhere in this document in relation to at least one transportation vehicle 200, when the vehicle(s) arrives and passes the determined route 106, for example.

The system 100 may be configured to manipulate the actuating device 204 (via the control commands) to initiate the moving of the platform 202 already before the actual geographical point 106 based on the predictive information of the becoming geometry changes on the path, such as based on the data received by the sensing devices 105 or other devices suitable for generating this kind of data, like database of a topography map with position data received e.g. from GNSS, such as GPS, or other positioning device. It is to be noted that the first or other master vehicle may have sensing device(s) 105 and it can send the command to the other vehicles (slaves) in the system. The commands may comprise information how (e.g. direction and speed) and when (time or coordinates) to manipulate the actuating means and thereby to control the system and path or orientation of the common load.

The vehicle 200 or the optimization system 100 may also comprise at least one moving device 107 for moving the vehicle 200, such as a wheel or crawler track, as is described in FIG. 10. The moving device may be coupled with the vehicle 200 or the balancing system 100 via a mounting device 108, such as e.g. an arm or cylinder or axis so that the mounting means can manipulate height or distance of the moving device in relation to the vehicle and thereby forming the balancing system and moving or tilting the vehicle or platform. Thus the mounting device 108, as manipulated and operated like described here, can be construed to be as the balancing system or arrangement 100 and thereby also controlling the path or orientation of the load, such as keeping the load in a certain horizontal plane or angle.

In an embodiment, a plurality of vehicles may comprise different combinations of masters and slaves. The arrangement may comprise one master vehicle and one or more slave vehicles that carry a common load. Alternatively, the arrangement may comprise a master vehicle leading the pack and at least one slave vehicle that carries the load. Still in further alternative solution, there may be one or more master vehicles and one or more slave vehicles that carry a common load.

In an embodiment, the vehicles may have different functions, such as steering and/or control function, data communication function, sensing function, and master/slave function. The roles between master and slave may be changed dynamically, and there may be several masters simultaneously.

FIGS. 12A-12E illustrate exemplary transportation vehicle system 300 for carrying a common load 206 according to an advantageous embodiment of the invention, where the system 300 comprises at least two transportation vehicles 200 for transportation the load 206. The load is common for at least two of the vehicles, and the load is typically a long or elongated load or large load. Each of the transportation vehicles 200 comprises advantageously a platform 202 for receiving the load 206, and an actuating device 204 for moving, tilting or otherwise positioning the platform in relation to at least one of said vehicles 200.

The platform 202 is moved advantageously so that the track 106 of the load and especially the track of the load between the moving vehicles 200 or in relation to at least one vehicle of the system travel a certain path 106. The path 106 may be a predetermined path, but it may also be determined during movement of the vehicles, such as providing control commands essentially in a real time e.g. from a centralized control system. The platform may also be moved in a controlled manner so that the position (bank or inclination angle in relation to horizontal, vertical or other reference) of the load is kept essentially constant or alternatively changed in a (pre)determined and controlled way during movement of the transportation vehicles or at least during movement of at least one vehicle of the system.

Figure 12A:
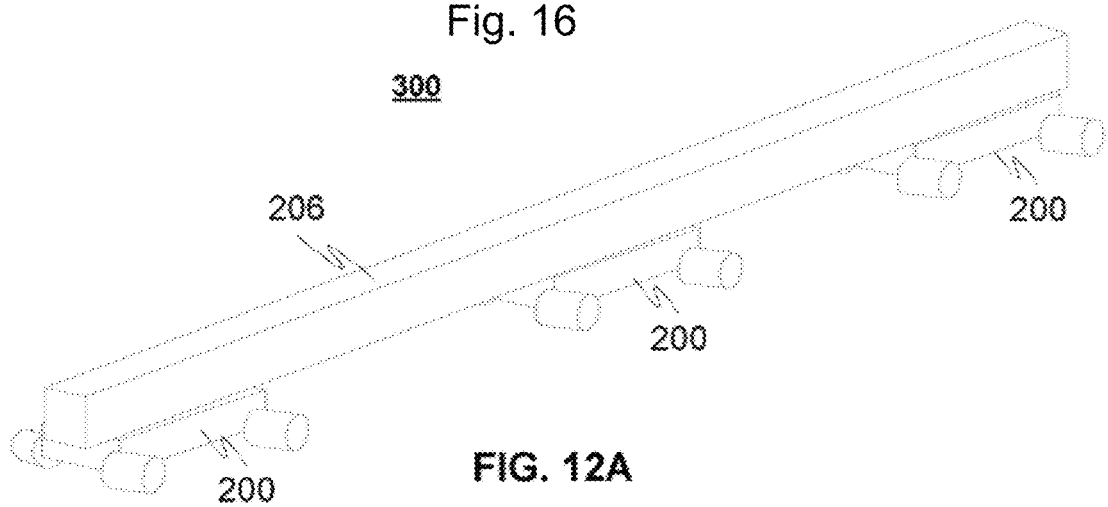
FIGS. 12A-12E illustrate exemplary transportation vehicle system for carrying a common load according to an advantageous embodiment of the invention.
Figure 12B:
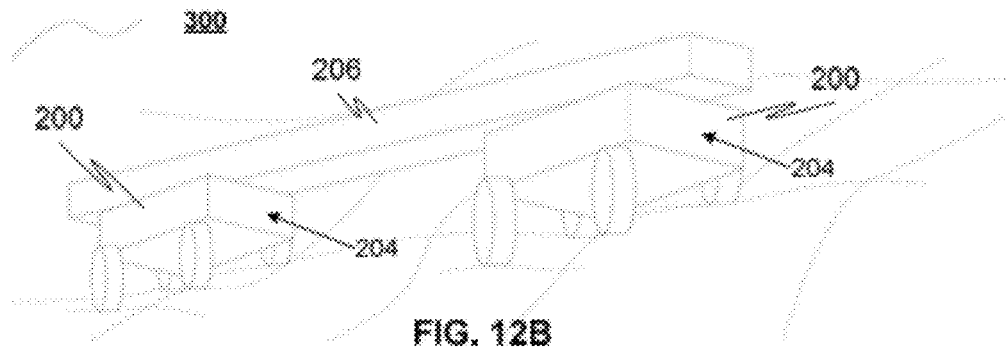
Figure 12C:
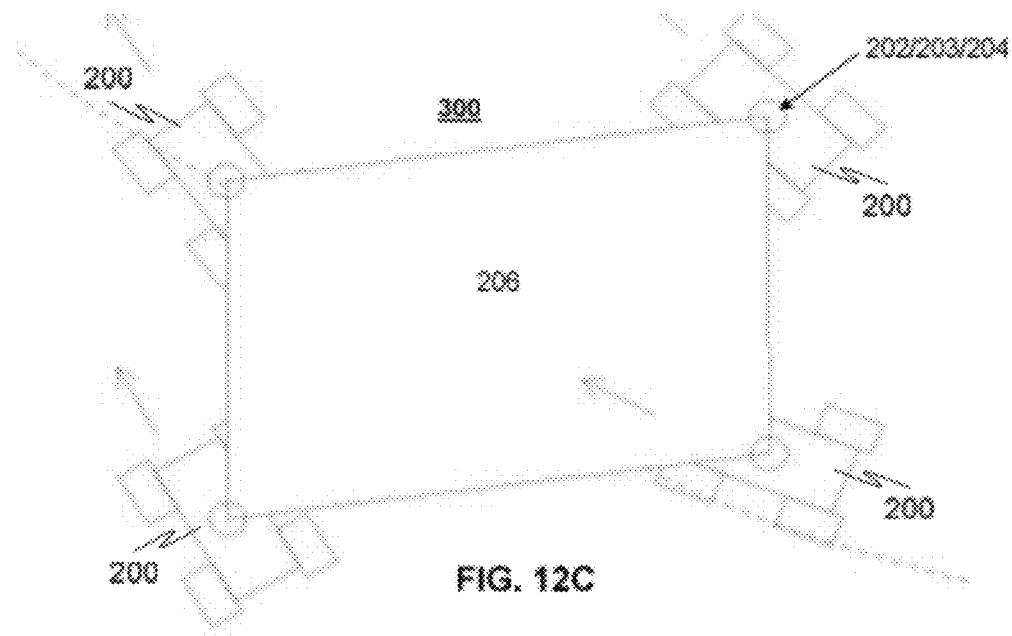
Figure 12D:
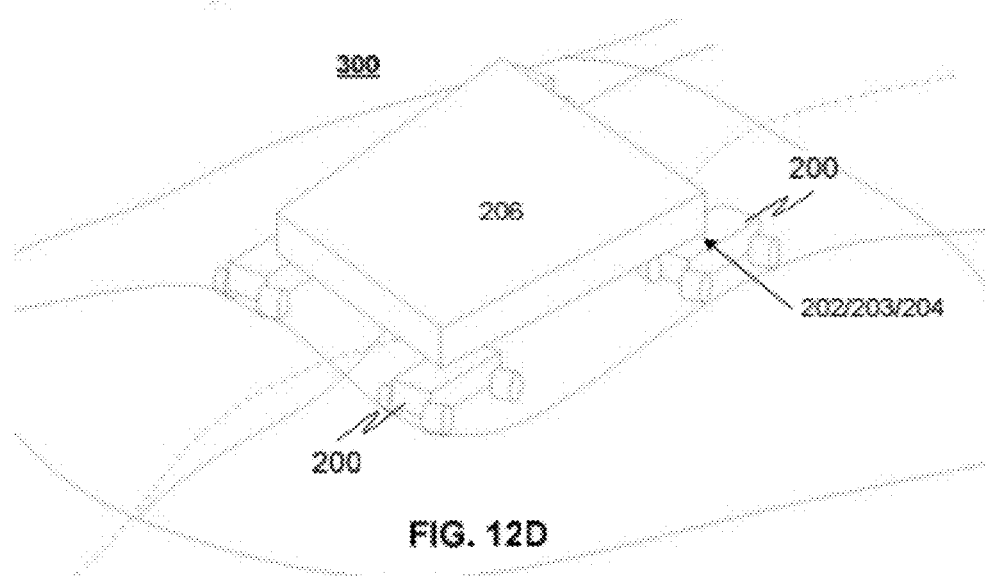
Figure 12E:
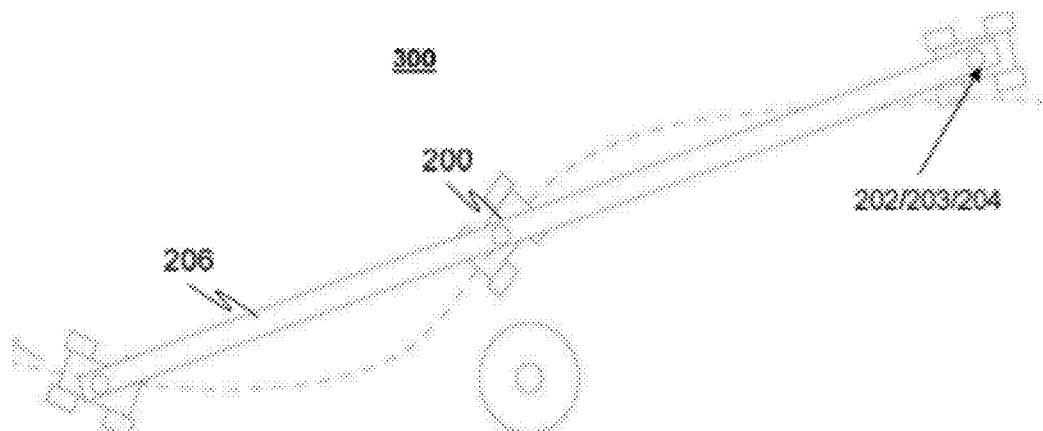

According to an advantageous embodiment the actuating device 204, but alternatively also vehicles are controlled so that the load 206 can be kept for example in a horizontal plane, as is described in FIG. 12B, for example, or that the track of the load travels a certain path 106, as is illustrated in FIG. 12C, 12E, but they can also be controlled so that the loading of each of the vehicles of the system is either essentially equal with each other or otherwise divided, e.g. determined beforehand due to topography of the terrain, like in FIG. 12D.

FIGS. 13A-13F illustrate exemplary communication system 400 for transportation vehicle system 300 for carrying a common load according to an advantageous embodiment of the invention. According to an embodiment one of the transportation vehicles 200 is functioning as a master transportation vehicle 200a and at least one of the transportation vehicles is as a slave 200b transportation vehicle, whereupon the master transportation vehicle 200a communicates 207 or otherwise provides the controlling commands for the slave transportation vehicle(s) 200b for moving the platforms in relation to the slave or other transportation vehicle 200 of the system and thereby managing the center of gravity or path or orientation of the common load 206 as described elsewhere in this document. As an example, a route 106 may be programmed beforehand to the master vehicle 200a for example, which communicates 207 suitable control command to other vehicles 200b of the system so that they follow the route, as well as controlling the platform and the load.

Figure 13A:
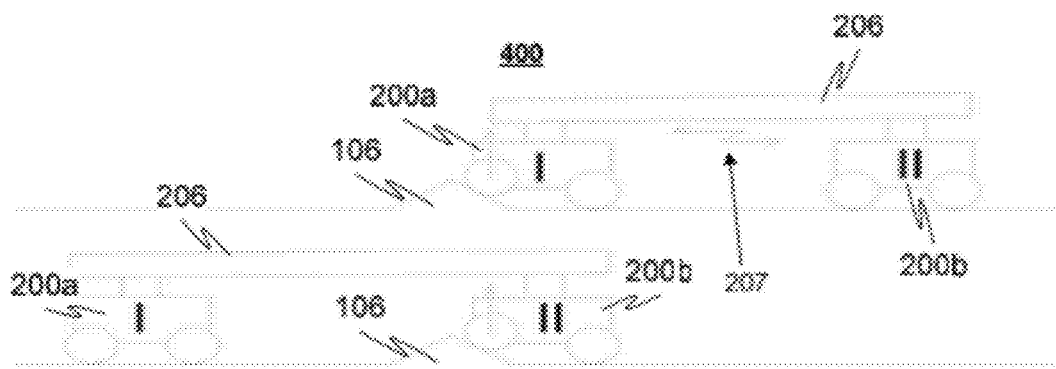
FIGS. 13A-13F illustrate exemplary communication system for transportation vehicle system for carrying a common load according to an advantageous embodiment of the invention.
Figure 13B:
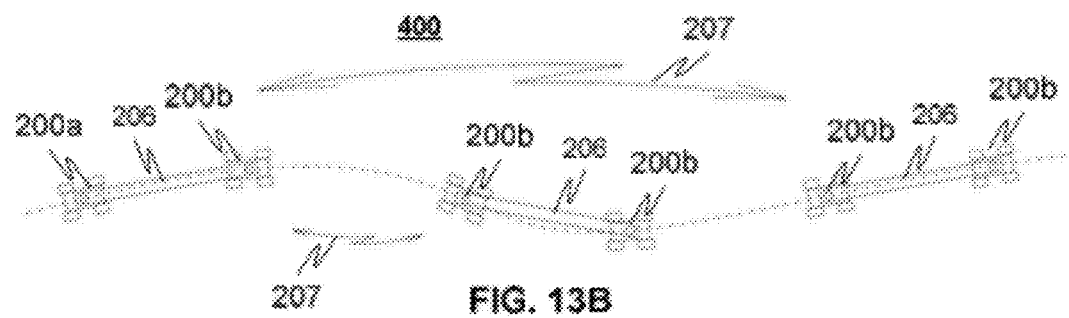
Figure 13C:
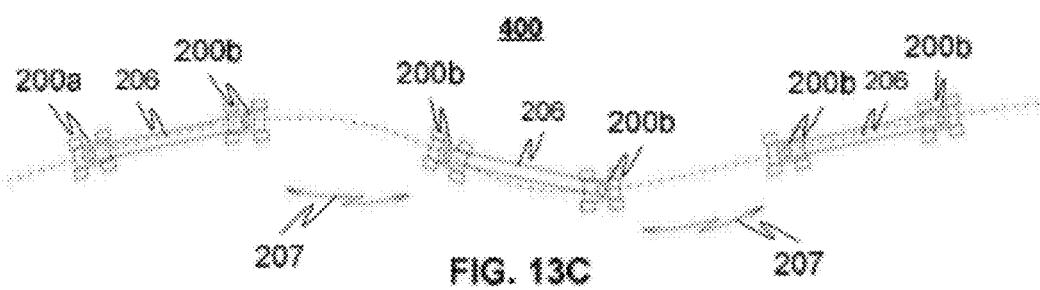
Figure 13D:
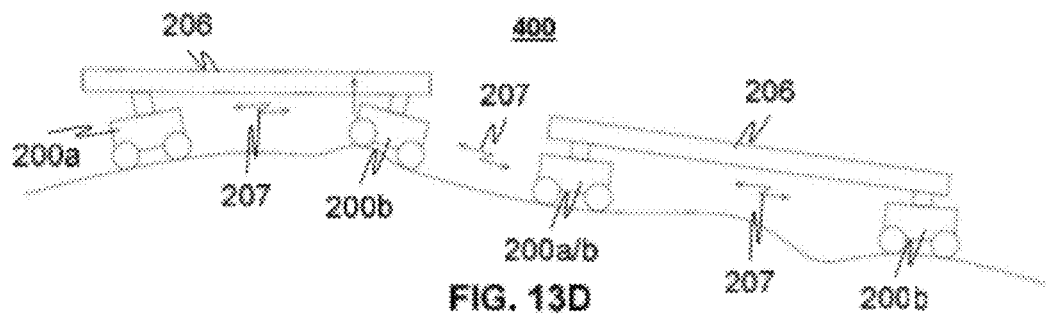
Figure 13E:
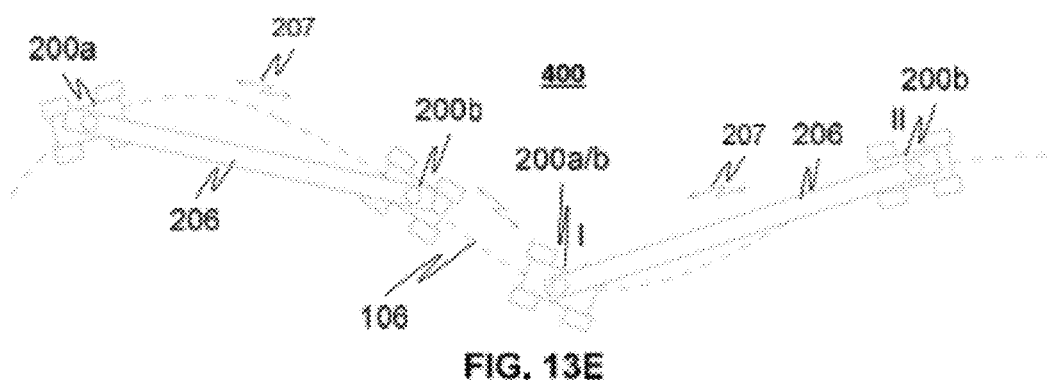
Figure 13F:
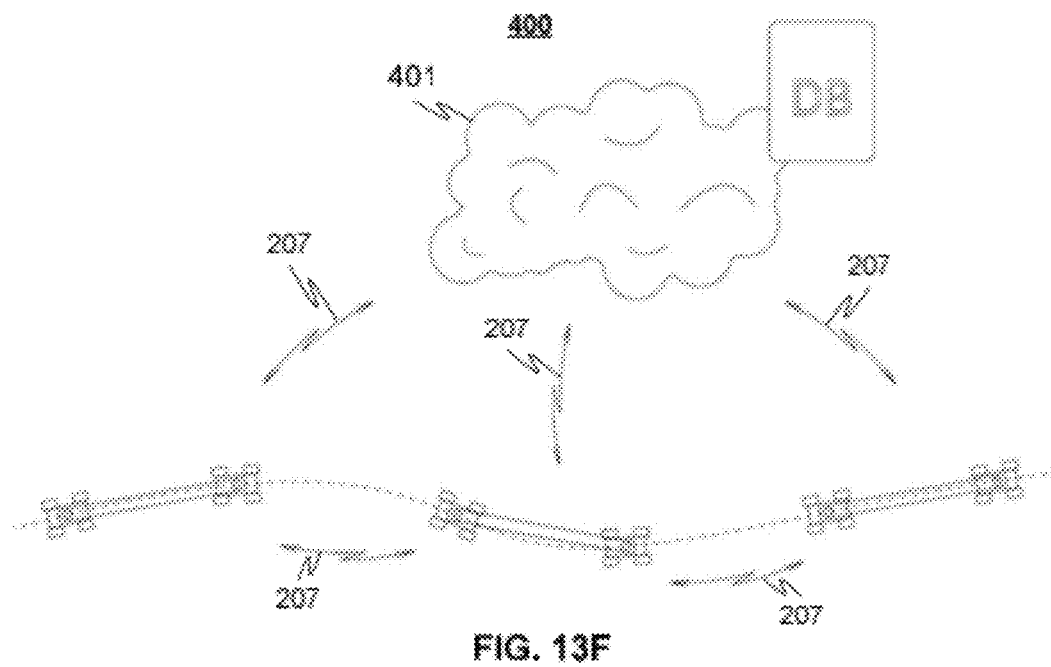

According to an embodiment the master transportation vehicle 200a may provide the controlling commands to all other slave vehicles of the system, as is described in FIG. 13B or the communication may happen from one to one vehicle as is described in FIG. 13C and 13D.

According to an embodiment the system 400 may also comprise a central controlling system 401, where the central controlling system communicates 207 or otherwise provides the controlling commands for at least one transportation vehicle 200, 200a, 200b for travelling a certain path, moving the platform and/or controlling the path and/or orientation of the load as described elsewhere in this document. In the case of central controlling system all the vehicles may be as slave vehicles, or alternatively one of the vehicles may function as a master and providing the control commands received from the central controlling system to other vehicles, namely slave vehicles.

It is to be noted that the communication link between the vehicles 200, as well as between the vehicles and the central controlling system may be bi-directional, whereupon e.g. the master transportation vehicle 200a may communicate environmental and other measured data to the central controlling system.

Advantageously the vehicles 200 of the system are operated in a synchronized manner with each other so that the relative velocity and movements of the platforms of at least two of the vehicles are configured to be actuated so that the resulting movements of these platforms causes a desired path 106 or position for the load to be transported. Advantageously the movements are performed for a common goal and they may be performed essentially simultaneously, but also a staggered way is possible.

In an embodiment, load position is dynamically adjusted in relation to at least one of the vehicles based on the path of progression, the terrain, the vehicles or such, for example. The load position may be optimized based on sensing signals.

In an embodiment, part of the control commands may be created beforehand, such as before starting the load movement along a certain path. Certain route may be defined and topographic information may be determined and based on that control commands are defined. During movement, further control commands may be generated dynamically.

Figure 14:
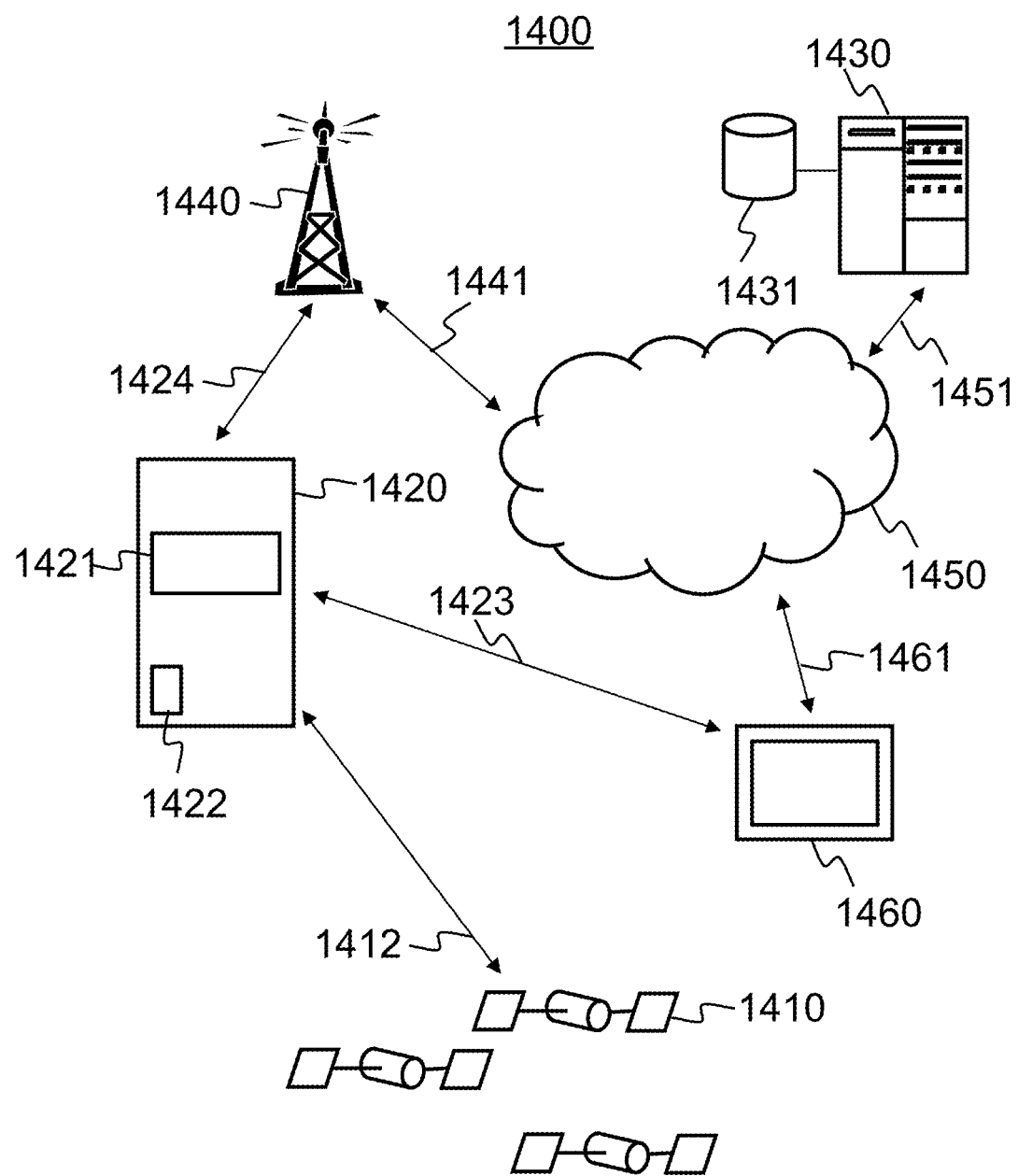
FIG. 14 shows a schematic picture of a system according to an example embodiment of the invention.

FIG. 14 shows a schematic picture of a system 1400 according to an example embodiment of the invention. The system 1400 comprises a plurality of satellites 1410 in orbit about the Earth. The orbit of each satellite 1410 is not necessarily synchronous with the orbits of other satellites and, in fact, is likely asynchronous. A global positioning system receiver apparatus such as the ones described in connection with preferred embodiments of the present invention is shown receiving spread spectrum global positioning system (GNSS) satellite signals 1412 from the various satellites 1410.

A vehicle 1420 of one of a plurality of vehicles carrying a common load may comprise controlling device 1421 that may be an integrated controlling device, or for example, a mobile phone, an Internet tablet, a mobile terminal or a laptop computer, for example. The controlling device 1421 is capable of downloading and locally executing software program code. The software program code may be a client application of a service whose server application is running on the server apparatus 1430 of the system 1400. The controlling device 1421 may comprise a sensing device 1422, such as an environmental and current activity data capturing element, such as an accelerometer, a compass, a wind sensor, a barometer, a GNSS receiver and a flute height sensor, for example. The controlling device 1421 is configured to be connectable to a wireless communication network 1440 over a wireless connection 1424. The wireless connection 1424 may comprise a mobile cellular network or a wireless local area network (WLAN), for example. The wireless communication network may be to a public data communication network 1450, for example the Internet, over a data connection 1441.

In an embodiment, the controlling device 1421 may be comprised in any part of the vehicle 1420, such as the platform, the sensing device 1422 or the framework of the vehicle 1420.

In an embodiment, the controlling device 1421 may also be located external to the vehicle 1420, for example in a user device 1460, in another vehicle or in the server 1430, 1431 connectable to the vehicle 1420 over network connection 1424,1423, 1412, for example.

In an embodiment, an arrangement is provided for optimizing load position in relation to a plurality of transportation vehicles comprising at least one master vehicle 1420 and at least one slave vehicle. The arrangement comprises a platform arranged to the at least one slave vehicle for receiving a load; an actuating device of the at least one slave vehicle for moving the platform in relation to the at least one slave vehicle; a sensing device 1422 configured to generate a vehicle sensing signal and/or a non-vehicle sensing signal; a controlling device 1421 of the at least one master vehicle 1420 configured to: receive at least one of the vehicle sensing signal and the non-vehicle sensing signal; generate controlling commands based on the received at least one of the vehicle sensing signal and the non-vehicle sensing signal; and transmit the controlling commands to the actuating device, wherein the actuating device is configured to receive the controlling commands and to move the platform in relation to the transportation vehicle based on the controlling commands.

In an embodiment, external control information may be received by a controlling device 1421, and controlling commands are generated based on the external control information, the vehicle sensing signal and the non-vehicle sensing signal by a controlling device 1421.

In an embodiment, the external control information is received from at least one of the following: another transportation vehicle; a user device 1260; and a cloud server 1430, 1431.

In an embodiment, controlling commands may be generated based on at least one sensing signal that may comprise a control signal based on speech recognition of a user voice commands nearby the vehicle or remotely from a user device.

The controlling device 1421 may learn from history data of the vehicle movements and controlling commands and such history data may be used as an input for generating controlling commands as well together with sensing signals generated by the sensing device. Controlling commands may also be associated to certain functional mode. Controlling commands may also be delayed before transmitting to the actuating device, either for operational reasons or security reasons, for example.

In an embodiment, controlling commands can be encrypted to improve security of the arrangement. Furthermore, history data, such as previous controlling commands and sensing device information may be stored within the vehicle, for example within the controlling device 1421.

In an embodiment, all history data may be permanently erased in response to a triggering signal, such as a signal indicating that the vehicle is damaged or destroyed and cannot be fully operated anymore. Erasing all data may be useful especially in security or military applications that requires strict privacy.

In an embodiment, the controlling commands are configured to control moving the platform in relation to the vehicle 1420 so that the centre of gravity is kept within a certain area or to balance or manage weight distribution between different portions of the vehicle 1420.

In an embodiment, the controlling commands are configured to control moving the platform towards a rear portion of the vehicle in response to detecting deceleration of the vehicle based on the vehicle sensing signal.

In an embodiment, the controlling commands are configured to control moving the platform towards a front portion of the vehicle in response to detecting acceleration of the vehicle based on the vehicle sensing signal.

In an embodiment, the controlling commands are configured to control moving the platform towards a left portion of the vehicle in response to detecting turning left of the vehicle based on the vehicle sensing signal.

In an embodiment, the controlling commands are configured to control moving the platform towards a right portion of the vehicle in response to detecting turning right of the vehicle based on the vehicle sensing signal.

In an embodiment, the system 1400 comprises a computer apparatus 1460 configured to be connectable to the controlling device 1421 over a data connection 1423. The data connection 1423 may comprise a wired connection or a wireless connection. The wired connection may comprise Universal Serial Bus (USB), High-Definition Multimedia Interface (HDMI) or local area network (LAN), for example. The wireless connection may comprise ™, Radio Frequency Identification (RF-ID) or wireless local area network (WLAN), for example. The computer apparatus 1460 may be connected to a public data communication network 1450, for example the Internet, over a data connection 1461.

In an embodiment, the system 1400 comprises a server apparatus 1430, which comprises a storage device 1431 for storing vehicle 1420 related data, such as control data, command data, external control information, history data, weather information, map information, topography data and profile data, for example, over data connection 1451.

In an embodiment, external control information may travel to a controlling device 1421 over different paths. A first path may comprise sending reference external control information generated by another user over a wireless communication network 1424, 1440, 1441 and public data communication network 1450, 1451 from the server apparatus 1430. A second path may comprise sending external control information to the computer apparatus 1460 and therefrom over the data connection 1423 to the controlling device 1421. A third path may comprise receiving external control information by the controlling device 1421 from another vehicle, or from a user of the vehicle 1420, either locally or remotely.

In an embodiment, a proprietary application in controlling device 1421 may be a client application of a service whose server application is running on the server apparatus 1430 of the system 1400. The proprietary application may capture the activity data of the vehicle 1420 to be stored at the server 1430, 1431. Also vehicle sensing signal and non-vehicle sensing signal related information may be retrieved by the proprietary application from the sensing device of the arrangement or the vehicle 1420.

In an embodiment, the proprietary application may capture current sensing signals to be processed at the controlling device 1421. Also current environmental data for the captured sensing signal information may be retrieved by the proprietary application from the capturing elements.

In an embodiment, a master vehicle 1420 comprises controlling device 1421 that sends controlling commands to one or more slave vehicles. The master vehicle 1420 may comprise a sensing device 1422 for generating sensing information that may be used for generating controlling commands. Controlling commands may be based on predefined control data, based on sensing information dynamically in real-time, manual steering data of at least one manned vehicle or any combination of these. Manual steering data may be generated by manual steering device of any of the vehicles or manual steering data generated by a remote controller, for example. Any sensing information or control command related information may be stored to the controlling device 1421 of the master vehicle, to any other vehicle or to the cloud server 1430, 1431.

In an embodiment, the master vehicle 1420 may transmit part of the sensing information and/or the controlling commands to one or more slave vehicles for optimization. The slave vehicles may further process the received data and utilize their own sensing information by slave vehicle sensing devices for optimization of the load. The master vehicle may also optimize its own progress and movement.

In an embodiment, different settings may be defined for the master and slave vehicles of what information they share to other vehicles. Vehicle information may be transmitted to other vehicle or cloud server for backup, reuse or further optimization, for example.

In an embodiment, a plurality of vehicles that may comprise slave vehicle(s) and master vehicle(s) and any combination thereof, generate vehicle sensing signal(s) and/or a non-vehicle sensing signal(s) using sensing device(s) arranged in the plurality of vehicles. The plurality of vehicles transmits their generated vehicle sensing signal(s) to a cloud server. The cloud server comprises a controlling device (and may thus act as a master) and the cloud server is configured to receive the vehicle sensing signal(s) and the non-vehicle sensing signal(s) from the plurality of vehicles, generate controlling commands based on the received at least one of the vehicle sensing signal(s) and the non-vehicle sensing signal(s); and transmit the controlling commands to an actuating device of the at least one slave vehicle for moving a platform in relation to the at least one slave vehicle, wherein the platform is arranged to the at least one slave vehicle for receiving a load. The actuating device is configured to receive the controlling commands and to move the platform in relation to the transportation vehicle based on the controlling commands. Such processing and generating controlling commands by the cloud server and transmitting the controlling commands to at least one slave vehicle is particularly advantageous in a situation where there are a plurality of vehicles (even tens of vehicles) that are far away from each other, at least some of them are with greater distance from other vehicles, and it would be difficult for a master vehicle to receive all sensing signals, process and generate control commands based on the signals and transmit the control commands to slave vehicles.

In an embodiment, a slave vehicle may be changed to a new master vehicle even during active load movement. This may be necessary, for example, in case of malfunction or destruction of the earlier master device, or due to change of terrain or heading direction. There may also be two or more master vehicle, due to the shape of the load, for example, such as width of the load requiring several master vehicles.

In an embodiment, the master vehicle 1420 may transmit control commands separately to a plurality of slave vehicles. Control commands may be different to different slave vehicles depending on their position in a fleet for carrying the common load, for example. The master vehicle 1420 may also transmit control commands only to one or more of the slave vehicles and those slave vehicles may then transmit the control data further to other slave vehicles.

In an embodiment, the master vehicle may have active data connection to the slave vehicles during movement or the master vehicle may setup data connection for transmitting control commands only when needed.

Figure 15:
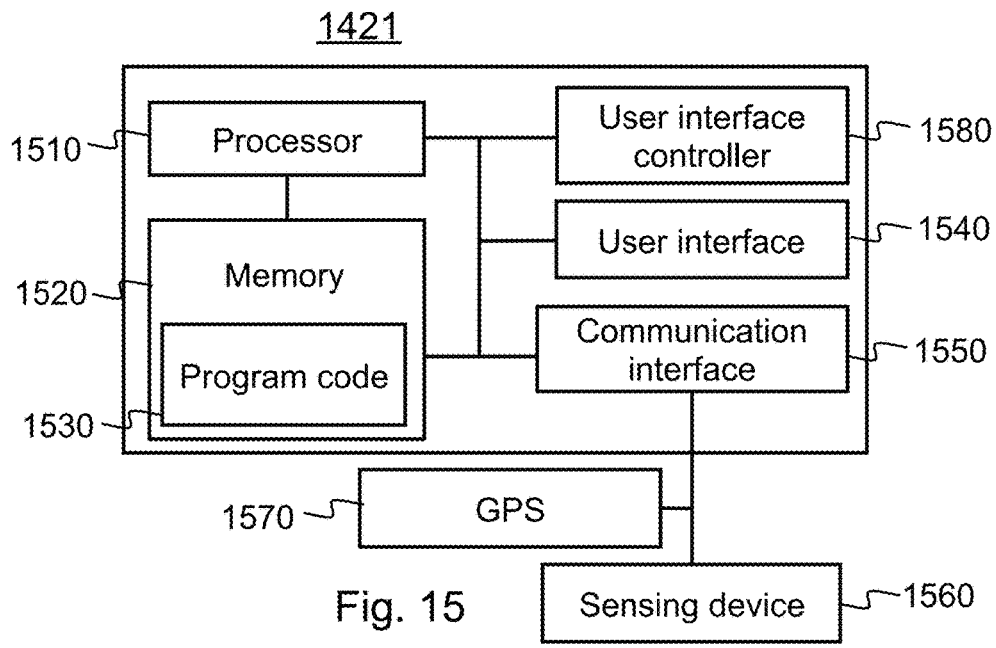
FIG. 15 presents an example block diagram of a controlling device in which various embodiments of the invention may be applied.

FIG. 15 presents an example block diagram of a controlling device 1421 in which various embodiments of the invention may be applied. The controlling device 1421 may be a user equipment (UE), user device or apparatus, such as a mobile terminal, a smart phone or other communication device.

The general structure of the controlling device 1421 comprises a user interface 1540, a communication interface 1550, a satellite positioning device (GNSS) 1570, a sensing device 1560 for capturing current activity data and current environmental data, a processor 1510, and a memory 1520 coupled to the processor 1510. The controlling device 1421 further comprises software 1530 stored in the memory 1520 and operable to be loaded into and executed in the processor 1510. The software 1530 may comprise one or more software modules and can be in the form of a computer program product. The controlling device 1421 may further comprise a user interface controller 1380.

The processor 1510 may be, e.g., a central processing unit (CPU), a microprocessor, a digital signal processor (DSP), a graphics processing unit, or the like. FIG. 15 shows one processor 1510, but the controlling device 1421 may comprise a plurality of processors.

The memory 1520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The controlling device 1421 may comprise a plurality of memories. The memory 1520 may be constructed as a part of the controlling device 1421 or it may be inserted into a slot, port, or the like of the controlling device 1421 by a user. The memory 1520 may serve the sole purpose of storing data, or it may be constructed as a part of an apparatus serving other purposes, such as processing data. A proprietary activity application, activity data and environmental data may be stored to the memory 1520.

The user interface controller 1580 may comprise circuitry for receiving input from a user of the controlling device 1421, e.g., via a keyboard, graphical user interface shown on the display of the user interfaces 1540 of the controlling device 1421, speech recognition circuitry, or an accessory device, such as a headset, and for providing output to the user via, e.g., a graphical user interface or a loudspeaker.

The satellite positioning device 1570 is configured to provide location information. Such information may comprise, for example, position coordinates, speed, direction of movement; and slope information.

The communication interface module 1550 implements at least part of data transmission. The communication interface module 1550 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB) or National Marine Electronics Association (NMEA) 0183/2000 standard for example. The communication interface module 1550 may be integrated into the controlling device 1421, or into an adapter, card or the like that may be inserted into a suitable slot or port of the controlling device 1421. The communication interface module 1550 may support one radio interface technology or a plurality of technologies. The controlling device 1421 may comprise a plurality of communication interface modules 1550.

A skilled person appreciates that in addition to the elements shown in FIG. 15, the controlling device 1421 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the controlling device 1421 may comprise a disposable or rechargeable battery (not shown) for powering when external power if external power supply is not available.

In an embodiment, the controlling device 1421 comprises speech recognition means. Using these means, a pre-defined phrase may be recognized from the speech and translated into control information for the controlling device 1421, for example.

The satellite positioning device 1570 and the sensing device 1560 may be configured to be comprised by the controlling device 1421 or connected as separate devices to the controlling device 1421. In case the satellite positioning device 1570 and the sensing device 1560 are comprised in the controlling device 1421 they may be connected to the controlling device 1421 using an internal bus of the controlling device 1421. In case the satellite positioning device 1570 and the sensing device 1560 are external devices connected to the controlling device 1421 they may be connected to the controlling device 1421 using communication interface 1550 of the controlling device 1421 or using the internal bus.

In an embodiment, not all elements of the controlling device 1421 are necessary, such as user interface controller 1580, user interface 1540, or positioning device 1570, for example.

Figure 16:
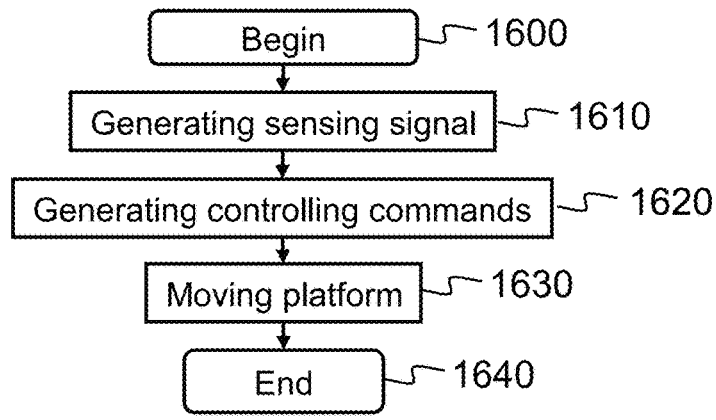
FIG. 16 shows a flow diagram showing operations in accordance with an example embodiment of the invention.

FIG. 16 shows a flow diagram showing operations in accordance with an example embodiment of the invention. In step 1600, the method for optimizing load position in relation to a plurality of transportation vehicles comprising at least one master vehicle and at least one slave vehicle is started, wherein at least one slave transportation vehicle comprises a platform for receiving a load, and an actuating device for moving the platform in relation to the transportation vehicle. In step 1610, a vehicle sensing signal and/or a non-vehicle sensing signal are generated by a sensing device. In step 1620, controlling commands are generated based on the vehicle sensing signal and/or the non-vehicle sensing signal by a controlling device of at least one master vehicle. In step 1630, the platform is moved in relation to the transportation vehicle based on the controlling commands by the actuating device. The method is ended in step 1640.

Figure 17:
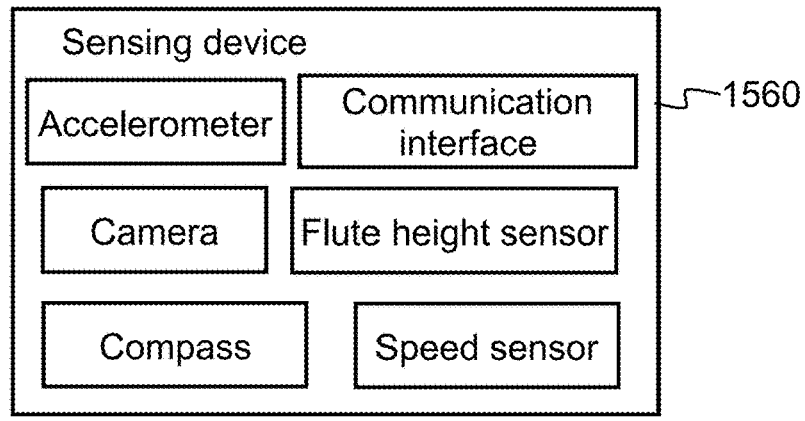
FIG. 17 presents an example block diagram of a sensing device in which various embodiments of the invention may be applied.

FIG. 17 presents an example block diagram of a sensing device 1560 in which various embodiments of the invention may be applied. The sensing device 1560 may comprise various means for activity data detection and environmental data detection, for example. The sensing device 1560 may be used for both vehicle and non-vehicle related data capturing.

In an embodiment, the sensing device 1560 may comprise at least one of the following devices:
an accelerometer;
an inclinometer;
an angular velocity sensor;
a geomagnetic field sensor;
a vehicle tyre pressure sensor;
a pressure or weight sensing sensor;
a transceiver for receiving weather information and/or topography information;
a camera;
an IR-scanner;
an ultrasound scanner;
a light detection and ranging (Lidar) device;
a radar;
a global navigation satellite system (GNSS) device;
an anemometer for providing wind information;
a wind sensor for providing wind information;
a sensor for providing flute height information;
a barometer for measuring air pressure;
a temperature sensor for measuring environmental temperature;
a water depth sensor for measuring depth information;
a chart plotter for providing position information;
a sail sensor for providing sail information;
a speed sensor for providing speed information;
a video camera for providing a video signal; and
a compass for providing direction information.

In an embodiment, a vehicle sensing signal generated by the sensing device 1560 may comprise at least one of the following: rotating speed information of at least one wheel of the transportation vehicle; inclination information of at least one wheel of the transportation vehicle or the transportation vehicle, and a centre of gravity of the transportation vehicle and the platform.

In an embodiment, the sensing device 1560 may comprise pressure or weight sensing device for determining pressure or weight difference or distribution between at least on two points of the arrangement or the vehicle, whereupon the sensing device 1560 is configured to determine location of the centre of gravity of the arrangement or the vehicle based on the pressure or weight difference, or the distribution.

The sensing device 1560 may also comprise several sensing devices 1560, combinations of any above mentioned devices, and the like. The environmental temperature may comprise air temperature, water temperature or ground surface temperature, for example.

In an embodiment, the sensing device 1560 may generate non-vehicle sensing signal that comprises at least one of the following:
terrain information relating to current position of the vehicle;
terrain information relating to a path in a heading of the vehicle;
terrain information around the vehicle;
control information generated in response to driver input;
location information of an object;

weather information; and
topographic information.

In an embodiment, the terrain information comprises geometry of the path in the heading of the vehicle.

In an embodiment, a wind sensor 1560 is configured to determine or measure wind angle and wind speed. The wind sensor 1560 may comprise any element of combination of elements operable to sense wind-related information for use by the controlling device 1421. For example, the wind sensor 1560 may be operable to sense apparent wind speed, apparent wind angle, true wind speed, true wind angle, wind velocity made good (VMG), combinations thereof, and the like.

In an embodiment, a video camera 1560 is configured to provide video signal. Based on the video signal the controlling device 1421 may determine at least part of the environmental data or non-vehicle data. For example terrain information or flute height may be determined based on the video signal from the video camera 1560. The determination may be done by video image processing, pattern recognition, measuring a rocking movement or relative movement of a horizon, for example.

The capturing device 1560 may comprise communication interface module implementing at least part of data transmission. The communication interface module may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB) or National Marine Electronics Association (NMEA) 0183/2000 standard for example. The communication interface module may be integrated into the sensing device 1560, or into an adapter, card or the like that may be inserted into a suitable slot or port of the sensing device 1560. The communication interface module may support one radio interface technology or a plurality of technologies. The sensing device 1560 may comprise a plurality of communication interface modules.

FIGS. 18*a*-*d* illustrates an example block diagram of arrangements comprising a plurality of vehicles in which various embodiments of the invention may be applied.

Figure 18A:
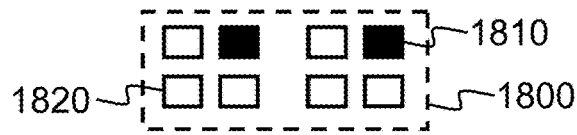
FIGS. 18a-d illustrates an example block diagram of arrangements comprising a plurality of vehicles in which various embodiments of the invention may be applied.

In FIG. 18*a* there is disclosed an example embodiment for an arrangement for optimizing load 1800 position in relation to a plurality of transportation vehicles 1810, 1820 comprising two master vehicles 1810 and six slave vehicles 1820. At least one platform is arranged to at least one vehicle for receiving the load 1800 and an actuating device of the at least one vehicle is arranged for moving the platform in relation to at least one vehicle. A sensing device configured to generate a vehicle sensing signal and/or a non-vehicle sensing signal is included in at least one of the vehicles and a controlling device of the at least one master vehicle 1810 is configured to receive at least one of the vehicle sensing signal and the non-vehicle sensing signal, generate controlling commands based on the received at least one of the vehicle sensing signal and the non-vehicle sensing signal; and transmit the controlling commands to the actuating device, wherein the actuating device is configured to receive the controlling commands and to move the platform in relation to the transportation vehicle based on the controlling commands.

Figure 18B:
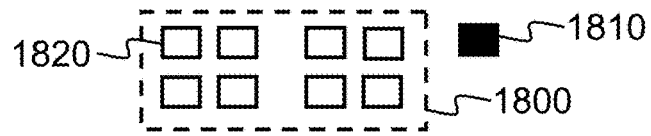

In FIG. 18*b* there is disclosed an example embodiment for an arrangement for optimizing load 1800 position in relation to a plurality of transportation vehicles 1810, 1820 comprising one master vehicle 1810 and eight slave vehicles 1820. The master vehicle 1810 does not carry the load 1800 but is configured to generate control commands and transmit them to the slave vehicles 1820. The master vehicle 1810 may move in front of the load carrying slaves and collect sensing data of the path, for example.

Figure 18C:
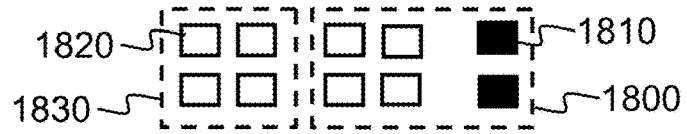

In FIG. 18*c* there is disclosed an example embodiment for an arrangement for optimizing load 1800, 1830 position in relation to a plurality of transportation vehicles 1810, 1820 comprising two master vehicles 1810 and eight slave vehicles 1820. Both master vehicles 1810 carry the load 1800 and are configured to generate control commands and transmit them to the slave vehicles 1820. Additionally a second load is carried by four slave vehicles that receive control commands from at least one of the master vehicles 1810 carrying the first load 1800.

Figure 18D:
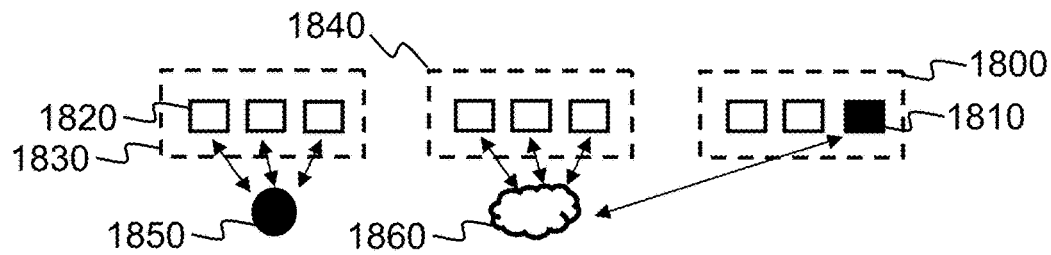

In FIG. 18*d* there is disclosed an example embodiment for an arrangement for optimizing load 1800, 1830, 1840 position in relation to a plurality of transportation vehicles 1810, 1820 comprising one master vehicle 1810 and eight slave vehicles 1820. The master vehicle 1810 carries the first load 1800 together with two slave vehicles and is configured to generate control commands and transmit them to the slave vehicles 1820 carrying all three loads 1800, 1830, 1840. The second load 1840 is carried by three slave vehicles that receive control commands from the master vehicle 1810 carrying the first load 1800. The third load 1830 is carried by three slave vehicles 1820 that receive control commands from the master vehicle 1810 carrying the first load 1800.

In an embodiment, an external controlling device 1850 may be configured to transmit external control information and the controlling commands may be generated or adjusted using the external control information from the external controlling device 1850, together with the vehicle sensing signal and/or the non-vehicle sensing signal by the controlling device. The external control information may be received by all the vehicles or only some of them. The external controlling device 1850 may comprise, for example, another transportation vehicle; or a user device.

In an embodiment, a cloud server 1860 may be configured to transmit external control information for the vehicles.

Without in any way limiting the scope, interpretation, or application of the claims appearing below, a technical effect of one or more of the example embodiments disclosed herein is an improved solution for optimizing load position in relation to a transportation vehicle. Another technical effect of one or more of the example embodiments disclosed herein is the provision of an arrangement to improve speed or smoothness of the moving vehicle. Another technical effect of one or more of the example embodiments disclosed herein is the provision of an arrangement to control moving the platform in relation to the vehicle so that the center of gravity is kept within a certain area or to balance or manage weight distribution between different portions of the vehicle in order to optimize speed or movement of the vehicle, for example.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications, which may be made without departing from the scope of the present invention as defined in the appended claims.

In addition it is to be noted that the vehicles of the invention can be provided with loading and unloading equipment for loading e.g. a demountable container as well as unloading it. Furthermore it is to be noted that according to an example the one vehicle may be as a main vehicle (e.g. without the load) for tracking and sensing a route and e.g. obstacles and inclinations or the like on the route and providing controlling information and/or controlling commands to at least one another vehicle transporting the load, whereupon the overall speed can be increased, because the balancing system of the vehicle carrying the load knows beforehand how to control the actuating means for moving the platform in relation to a vehicle and so to control a center of gravity of the system or vehicle to locate within a certain area in relation the system or vehicle by moving the platform in relation to said vehicle.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims. For example plurality of the transportation vehicles described in this document can be coupled to move in a synchronized manner with each other so that for example relative velocity and movements of the platforms of at least two of the vehicles are actuated, so moved, essentially simultaneously.

The invention claimed is:

1. An arrangement for optimizing load position in relation to a plurality of transportation vehicles comprising at least one master vehicle and at least one slave vehicle, the arrangement comprising:
    a platform arranged to the at least one slave vehicle for receiving a load;
    an actuating device of the at least one slave vehicle for moving the platform in relation to the at least one slave vehicle;
    a sensing device configured to generate a vehicle sensing signal and/or a non-vehicle sensing signal;
    a controlling device of the at least one master vehicle configured to:
    receive at least one of the vehicle sensing signal and the non-vehicle sensing signal;
    generate controlling commands based on the received at least one of the vehicle sensing signal and the non-vehicle sensing signal; and
    transmit the controlling commands to the actuating device
    wherein the actuating device is configured to receive the controlling commands and to move the platform in relation to the transportation vehicle based on the controlling commands.

2. The arrangement of claim 1, comprising at least two transportation vehicles for transporting the load, the load being common for at least two of the transportation vehicles, each vehicle comprising:
    a platform for receiving the load, and
    an actuating device of at least one vehicle for moving the platform in relation to the at least two of the transportation vehicles;
    wherein the actuating device is configured to receive the controlling commands and to move the platform in relation to the at least two of the transportation vehicles based on the controlling commands.

3. The arrangement of claim 2, wherein the actuating device is configured to move the platform in relation to at least one of the vehicles so that:
    the load travels a certain path; or
    the load position or level of the load is kept constant or changed
in a controlled way in relation to at least one transportation vehicle during movement of at least one transportation vehicle.

4. The arrangement of claim 2, comprising at least two slave transportation vehicles for transporting the load, the load being common for the at least two slave transportation vehicles, each slave vehicle comprising:
    a platform for receiving the load, and
    an actuating device for moving the platform in relation to at least one slave transportation vehicle;
    wherein the actuating device is configured to receive the controlling commands from a master vehicle not receiving the load, and to move the platform in relation to at least one slave transportation vehicle based on the controlling commands.

5. The arrangement of claim 2, comprising at least two slave transportation vehicles and at least one master transportation vehicle for transporting the load, the load being common for the at least two slave transportation vehicles and the master transportation vehicle, each vehicle comprising:
    a platform for receiving the load; and
    an actuating device for moving the platform in relation to at least one transportation vehicle;
    wherein the actuating device is configured to receive the controlling commands from the master vehicle, and to move the platform in relation to at least one transportation vehicle based on the controlling commands.

6. The arrangement of claim 1, comprising:
    sensing devices of a plurality of slave vehicles configured to generate the vehicle sensing signals and/or the non-vehicle sensing signals;
    the controlling device of the at least one master vehicle is configured to:
    receive the vehicle sensing signals and/or the non-vehicle sensing signals;
    generate controlling commands based on the vehicle sensing signals and/or the non-vehicle sensing signals; and
    transmit the controlling commands to the actuating device.

7. The arrangement of claim 1 comprising at least two master vehicles, wherein a first master vehicle comprising:
    a sensing device configured to generate a vehicle sensing signal and/or a non-vehicle sensing signal, wherein the first master vehicle not comprising a platform for receiving the load; and
a second master vehicle comprising:
    a controlling device configured to:
    receive the vehicle sensing signal and/or the non-vehicle sensing signal; and
    generate controlling commands based on the vehicle sensing signal and/or the non-vehicle sensing signal.

8. The arrangement of claim 1, wherein the controlling commands comprise instructions to start the movement of the platform based on certain coordinate position and thereby controlling and changing a location or position of the platform and/or load in the coordinate position or already before the transportation vehicle arrives at the coordinate position.

9. The arrangement of claim 1, wherein the controlling device is pre-programmed or a self-learning system for learning a geometry of a predriven road or being configured to receive geometry data from topography map and based on that configured to generate the controlling commands.

10. The arrangement of claim 1, wherein the vehicle sensing signal comprises sensing location of a center of gravity of the transportation vehicle and the platform, wherein the controlling commands are configured to control moving the platform in relation to the vehicle so that the center of gravity is kept within a certain area or to balance or manage weight distribution between different portions of the vehicle.

11. The arrangement of claim 1, wherein the sensing device comprising pressure or weight sensing device for determining pressure or weight difference or distribution between at least on two points of the arrangement or the vehicle, whereupon the sensing device is configured to determine location of the center of gravity of the arrangement or the vehicle based on the pressure or weight difference, or the distribution.

12. The arrangement of claim 1, wherein the sensing device for generating the vehicle sensing signal comprising at least one of the following:
   an accelerometer;
   an inclinometer;
   a vehicle tyre pressure sensor;
   a pressure or weight sensing sensor;
   an angular velocity sensor; and
   a global navigation satellite system (GNSS) device.

13. The arrangement of claim 1, wherein the sensing device for generating the non-vehicle sensing signal comprising at least one of the following:
   a geomagnetic field sensor;
   a transceiver for receiving weather information and/or topography information;
   a camera;
   an IR-scanner;
   an ultrasound scanner;
   a user input device to receive and generate control information generated in response to driver input;
   a light detection and ranging (Lidar) device; and
   a radar.

14. The arrangement of claim 1, wherein the non-vehicle sensing signal comprises at least one of the following:
   terrain information relating to current position of the vehicle;
   terrain information relating to a path in a heading of the vehicle;
   terrain information around the vehicle;
   control information generated in response to driver input;
   location information of an object;
   weather information; and
   topographic information, wherein the terrain information comprising geometry of the path in the heading of the vehicle.

15. The arrangement of claim 14, wherein the actuating device is configured to initiate the moving of the platform based on geometry changes on the path.

16. The arrangement of claim 1, wherein the actuating device is configured to perform at least one of the following:
   move the platform in a XY-plane, Z-direction being essentially perpendicular to the XY-plane;
   tilt or bank the platform in relation to at least one of the X, Y and Z axes; and
   rotate the platform around a point locating in the XY-plane.

17. The arrangement of claim 1, wherein the actuating device comprising at least one of the following: a hydraulically or pneumatically operated cylinder, an electric motor, a threaded rod, a push bar, and a chain, wherein the first end of the actuating device is configured to be operationally coupled with the platform and another end is configured to be operationally coupled with the vehicle either directly or via an accessory device, and further wherein length, angle or position of the actuating device is configured to be adjusted based on the controlling commands.

18. A transportation vehicle, comprising an arrangement of claim 1, and further comprising at least one moving device for moving the vehicle, each of the moving devices being coupled with the vehicle via a mounting, where the mounting is configured to adjust height or distance of the moving devices in relation to the vehicle.

19. A method for optimizing load position in relation to a plurality of transportation vehicles comprising at least one master vehicle and at least one slave vehicle, wherein at least one slave transportation vehicle comprises a platform for receiving a load, and an actuating device for moving the platform in relation to the transportation vehicle, the method comprising:
   generating a vehicle sensing signal and/or a non-vehicle sensing signal by a sensing device;
   generating controlling commands based on the vehicle sensing signal and/or the non-vehicle sensing signal by a controlling device of at least one master vehicle; and
   moving the platform in relation to the transportation vehicle based on the controlling commands by the actuating device.

20. The method of claim 19, further comprising:
   receiving external control information by a controlling device; and
   generating controlling commands based on the external control information, the vehicle sensing signal and/or the non-vehicle sensing signal by the controlling device, wherein the external control information is received from at least one of the following:
   another transportation vehicle;
   a user device; and
   a cloud server.

* * * * *